US012056962B2

(12) United States Patent
Salter et al.

(10) Patent No.: US 12,056,962 B2
(45) Date of Patent: Aug. 6, 2024

(54) SELF LEARNING VEHICLE CARGO UTILIZATION AND CONFIGURATION CONTROL

(71) Applicant: Ford Global Technologies, LLC, Dearborn, MI (US)

(72) Inventors: Stuart C. Salter, White Lake, MI (US); Pietro Buttolo, Dearborn Heights, MI (US); Annette Lynn Huebner, Highland, MI (US); David Kennedy, Canton, MI (US); Hussein Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 17/543,321

(22) Filed: Dec. 6, 2021

(65) Prior Publication Data

US 2023/0177888 A1 Jun. 8, 2023

(51) Int. Cl.
*G07C 5/00* (2006.01)
*G05D 1/00* (2024.01)
*G07C 5/08* (2006.01)

(52) U.S. Cl.
CPC .......... *G07C 5/008* (2013.01); *G05D 1/0027* (2013.01); *G07C 5/0841* (2013.01)

(58) Field of Classification Search
CPC ..... G07C 5/008; G07C 5/0841; G05D 1/0027
See application file for complete search history.

(56) References Cited

U.S. PATENT DOCUMENTS

| 8,788,085 | B2 | 7/2014 | Panzram et al. |
| 9,886,799 | B2 | 2/2018 | Kwak |
| 10,161,746 | B2 | 12/2018 | Ochsendorf et al. |
| 10,300,832 | B1* | 5/2019 | Folks .................. B60N 2/305 |
| 2019/0143936 | A1* | 5/2019 | Abel Rayan .......... B60R 25/10 |
| | | | 701/2 |

(Continued)

FOREIGN PATENT DOCUMENTS

CN 110298521 * 10/2019

OTHER PUBLICATIONS

CN 110298521 A machine translation (Year: 2019).*

(Continued)

*Primary Examiner* — Anne Marie Antonucci
*Assistant Examiner* — Jingli Wang
(74) *Attorney, Agent, or Firm* — Emily Drake; Eversheds Sutherland (US) LLP (57) ABSTRACT

A vehicle cargo utilization control system includes a processor disposed in a vehicle controller and a memory for storing executable instructions. The processor is programmed to execute the instructions to receive identity information associated with a vehicle user from a mobile device and vehicle sensory devices, and determine identity of the vehicle user. The system receives receive anthropometry information, and entry and exit data associated with the vehicle user that can indicate mobility limitations or special uses of the vehicle cargo hold that have been observed and recorded by the system. The processor may determine a vehicle recommendation based on the identity of the vehicle user and the anthropometry information, and cause a vehicle configuration change that modifies a vehicle system based on the unique user identity, mobility limitations, and predicted use of the vehicle.

19 Claims, 5 Drawing Sheets

(56) References Cited

U.S. PATENT DOCUMENTS

2019/0367036 A1\* 12/2019 Brombach ......... G07C 9/00571
2020/0056901 A1\* 2/2020 Engle .................. G05D 1/0027
2021/0166103 A1\* 6/2021 Jackson ................ G06N 3/088
2021/0276501 A1\* 9/2021 Li ........................... G06T 7/521

OTHER PUBLICATIONS

Rafal Burdzik et al., Cargo Loading and Unloading Efficiency Analysis in Multimodal Transport, Intermodal Transport Review, vol. 26, 2014, No. 4, 323-331.

\* cited by examiner

SELF LEARNING VEHICLE CARGO UTILIZATION AND CONFIGURATION CONTROL

BACKGROUND

Vehicle selection is not just about economics, performance or image. As people age, the facility of vehicle entry and exit become more important considerations for vehicle utility. Vehicles that are low to the ground may be difficult for those with limited mobility. At the same time, a vehicle having higher profiles may allow a user to easily step out of the vehicle rather than climbing up and out of a performance vehicle Families may have individuals that have unique needs and use of these vehicles. Those with mobility limited, or have other needs such as frequent cargo space users are frequent vehicle users. As cargo and interior is use is evaluated, it is advantageous to determine vehicle selection suggestions, and also be able to prepare the vehicle in advance of predictable use.

Families can also include users with unique needs not only for ease of entry and exit, but for cargo use of a vehicle. For example, some users within the same family may take active part in sports, such that they frequently utilize cargo space for sports equipment. The same family may also have individuals with a hobby or business that requires frequent use of a cargo hold to move large items such as furniture.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In vehicle user groups (e.g., families, work groups sharing a vehicle, etc.) many users carry smartphones or other smart devices such as wearables. Device sensors on the mobile devices may generate sensory data that is combinable with sensory data from vehicle sensors and aggregated on a remote computing platform or other system.

Unlike existing art, where data about a specific vehicle performance is used to determine the optimal specifications of a future purchase, embodiments of the present disclosure may utilize vehicle and user mobile device data to provide cargo and vehicle use suggestions, and to automatically predict vehicle cargo use based on a particular user to select and automate vehicle cargo and interior configurations.

This disclosure discusses a cargo utilization control system that may monitor and evaluate multiple vehicles used in a family/friend/work group fleet. The system includes GPS technology that localizes vehicles (e.g., determines if a vehicle is parked home, if at grocery store, work, . . . etc.).

In some aspects, the cargo utilization control system may utilize vehicle and mobile sensory devices to determine how vehicles are shared, and the occupancy of each vehicle on trips. Using GPS technology, the cargo utilization control system may localize the vehicle can be tracked wherever it operates.

In one or more embodiments, the cargo utilization control system may leverage vehicle sensory devices in parallel with mobile device data retrieved from user devices within the group. More particularly, the vehicle may use sensory devices in dash cam, second row camera, exterior B-pillar camera, and cargo camera, among other devices, to determine whether a customer will use the cargo space, and generate a predicted use based on customer identity. The cargo utilization control system may generate and characterize the sensory device data to identify users in the user group, and determine or predict how group user will utilize the cargo space based on the user identity, vehicle location, historic user settings in the vehicle, time information, date information, user age, known mobility issues, and other factors.

In some embodiments, the cargo utilization control system may obtain video and image data using vehicle cameras, and determine a relative ease of use historically experienced by various members of the group as they interact with the vehicle over time. For example, the system may determine levels of ease or difficulty (using quantitative analyses) respective to identified user profiles by observation, sensory data analysis, and predictive analytics. The system may evaluate respective ease of loading and unloading for respective users. The system may receive heart rate data from wearables, and use these various points of information to determine ease of use for the user. The cargo utilization control system may recommend a same or a different vehicle to vehicle operators within the group for future trips.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Figure 1:
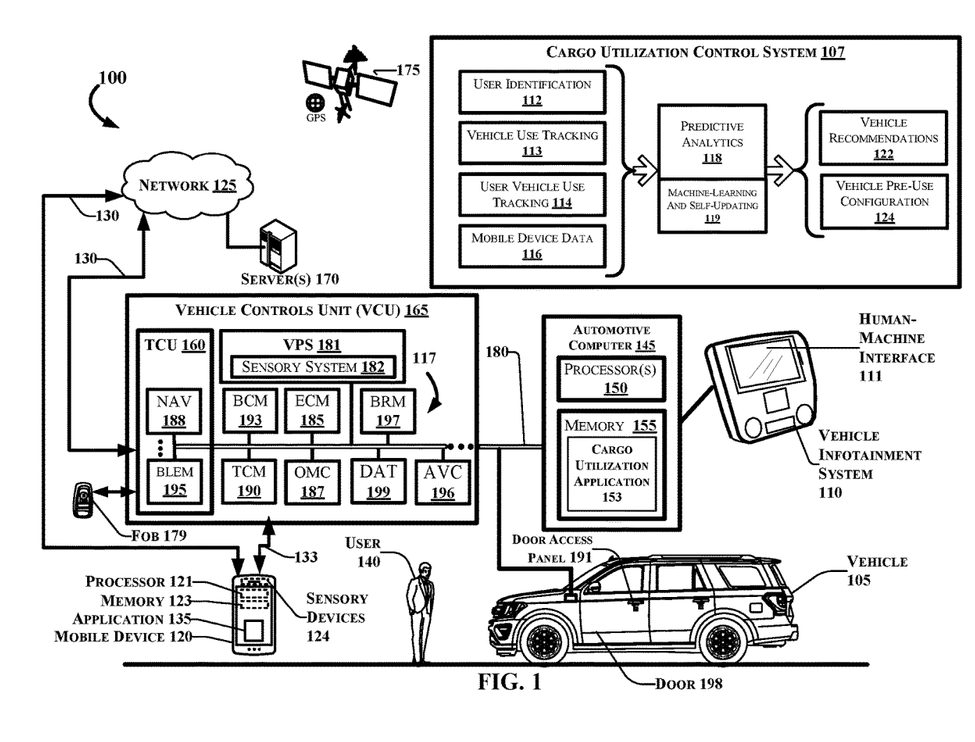
FIG. 1 depicts an example computing environment in which techniques and structures for providing the systems and methods disclosed herein may be implemented.

FIG. 1 depicts an example computing environment 100 that can include a vehicle 105. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140 and the vehicle 105 may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques. The mobile device 120 may provide user authentication and identification, sensory data associated with the user 140, and vehicle use data indicative of how the user 140 interacts with the vehicle. In other aspects, the mobile device 120 may provide information indicative of date, time, cargo, location, schedules, and other user-identifiable information.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized. The GPS 175 may localize the vehicle 105 and provide time, date, and other information indicative of how the user 140 interacts with the vehicle 105, and how cargo utilization control system 107 may optimize cargo and other vehicle settings to maximize user ease of entry and exit of the vehicle 105.

FIG. 1 illustrates a functional block for the cargo utilization control system 107. The system 107 can perform user identification 112, vehicle use tracking 113, user vehicle use tracking 114 that records particular tracked localized events associated with the user 140, and uses mobile device data 116 associated with the mobile device 120. The system 107 may take the inputs 112, 113, 114, and 116, and leverage predictive analytics 118 and machine-learning and self-updating algorithms 119 to produce vehicle recommendations 122 and vehicle pre-use configurations 124. The following sections describe each respective functional element of the system 107 in greater detail.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet. The SDN may generate vehicle use information that can include vehicle use history data usable by cargo utilization control system 107 to generate vehicle recommendations.

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in REV (PHEV) that includes a REV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

According to embodiments of the present disclosure, the cargo utilization control system 107 may be configured and/or programmed to operate with a vehicle having an autonomous vehicle controller. Accordingly, the cargo utilization control system 107 may provide some aspects of human control to the vehicle 105, when the vehicle is configured as an AV.

The mobile device 120 can include a memory 123 for storing program instructions associated with an application 135 that, when executed by a mobile device processor 121, performs aspects of the disclosed embodiments. The application (or "app") 135 may be part of the cargo utilization control system 107, or may provide information to the cargo utilization control system 107 and/or receive information from the cargo utilization control system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) that can be direct connection(s) between the vehicle 105 and the mobile device 120. The wireless connection(s) 133 may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the cargo utilization control system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a cargo utilization control program code. The memory 155 can include any one or a combination of volatile memory elements (e.g., Dynamic Random Access Memory (DRAM), synchronous dynamic random-access memory (SDRAM), etc.) and can include any one or more nonvolatile memory elements (e.g., Erasable Programmable Read-Only Memory (EPROM), flash memory, Electronically Erasable Programmable Read-Only Memory (EEPROM), Programmable Read-Only Memory (PROM), etc.

The VCU 165 may share a power bus 178 with the automotive computer PAGE-145, and may be configured and/or programmed to coordinate the data between vehicle 105 systems, connected servers (e.g., the server(s) 170), and other vehicles (not shown in FIG. 1) operating as part of a vehicle fleet (e.g., a set of vehicles operated and/or owned within a single workgroup, family, organization, etc. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Biometric Authentication and Occupant Monitoring Controller (Occupant Monitoring Controller-OMC) 187, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the cargo utilization control system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the fob 179).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the cargo utilization control system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the cargo utilization control system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

In some aspects, the vehicle 105 may include one or more Door Access Panels (DAPs) 191 disposed on exterior door surface(s) of vehicle door(s) 198, and connected with a DAP controller (not shown in FIG. 1). In some aspects, the user 140 may have the option of entering a vehicle by typing in a personal identification number (PIN) on an exterior interface associated with a vehicle. The user interface may be included as part of a Door Access Panel (DAP) 191, a wireless keypad, included as a part of the mobile device 120, or included as part of another interface. The DAP 191, which may operate and/or communicate with the OMC 187 or another of the ECUs 117, can include and/or connect with an interface with which a ridehail passenger, user, (or any other user such as the user 140) may input identification credentials and receive information from the system. In one aspect, the interface may be or include a DAP 191 disposed on a vehicle door 198, and can include an interface device from which the user can interact with the system by selecting their unique identifier from a list, and by entering personal identification numbers (PINS) and other non-personally identifying information. In some embodiments, the interface may be a mobile device, a keypad, a wireless or wired input device, a vehicle infotainment system 110, and/or the like. Accordingly, it should be appreciated that, although a DAP is described with respect to embodiments herein, the interface may alternatively be one or more other types of interfaces described above.

Figure 2:
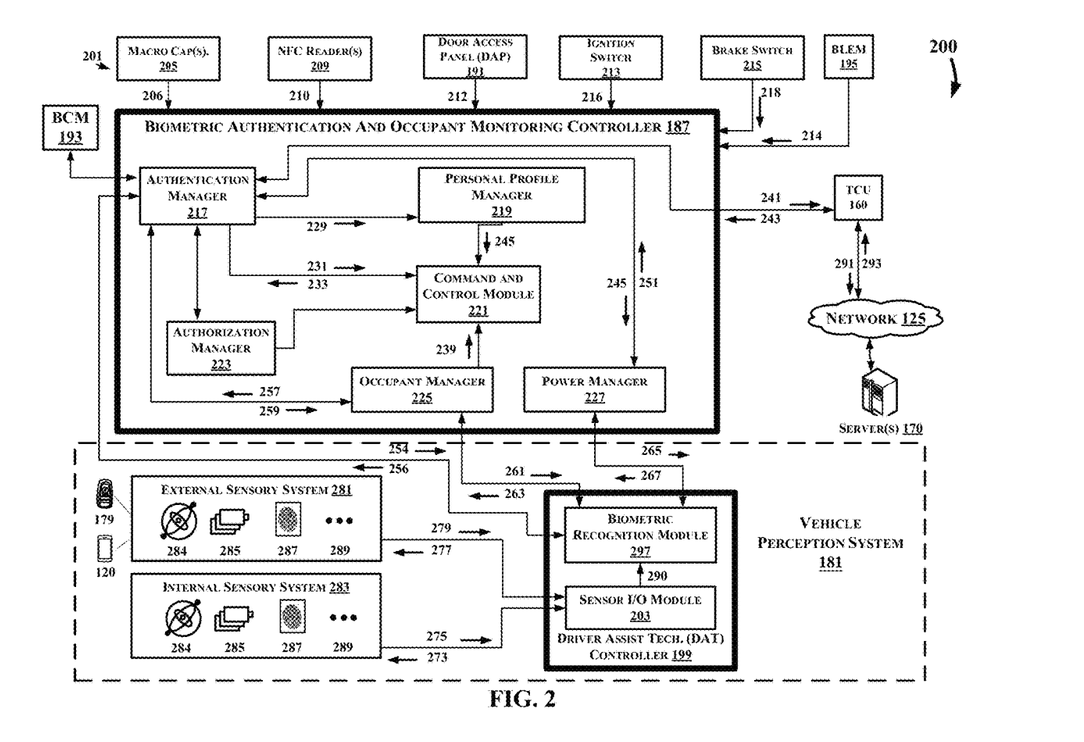
FIG. 2 illustrates a biometric authentication and occupant monitoring interface diagram in accordance with the present disclosure.

The OMC 187, described in greater detail with respect to FIG. 2, can include sensory and processor functionality and hardware to facilitate user and device authentication, and provide occupant customizations and support that provide customized experiences for vehicle occupants. The OMC 187 may connect with a Driver Assist Technologies (DAT) controller 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 199 may provide Level-1 through Level-3 automated driving and driver assistance functionality that can include, for example, active parking assistance, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition.

The DAT controller 199 can obtain input information via the sensory system(s) 182, which may include sensors disposed on the vehicle interior and/or exterior (sensors not shown in FIG. 1). The DAT controller 199 may receive the sensor information associated with driver functions, vehicle functions, and environmental inputs, and other information. The DAT controller 199 may characterize the sensor information for identification of biometric markers stored in a secure biometric data vault (not shown in FIG. 1) onboard the vehicle 105 and/or via the server(s) 170.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as sensory systems 181). The sensory systems 182 may be configured and/or programmed to obtain sensor data usable for biometric authentication, and for performing driver assistances operations such as, for example, active parking, trailer backup assistances, adaptive cruise control and lane keeping, driver status monitoring, and/or other features.

In some aspects, cargo utilization control system 107 may perform authentication and user identification, among other methods, using a PaaK system (not shown in FIG. 1). The vehicle PaaK system may determine and monitor a location for a PaaK-enabled mobile device (e.g., the mobile device 120) relative to a vehicle location, and broadcast a pre-authentication message to the mobile device 120, or another passive key device such as the fob 179. As the mobile device 120 approaches a predetermined communication range relative to the vehicle position (e.g., 1 meter, 3 meters, 10 meters, etc.) the mobile device may transmit a preliminary response message to the PaaK-enabled vehicle 105. The vehicle PaaK system may cache the preliminary response message until a user associated with the authenticating device performs an unlock action such as actuating a vehicle door latch/unlatch mechanism by pulling a door handle, for example. The PaaK system may unlock the door using data already sent to the pre-processor to perform a first level authentication without the delay associated with full authentication steps.

After actuation of the door latch, the PaaK system may perform post-authentication confirmation using a secure processor, by transmitting, to the requesting device, a validation message that includes a challenge value requiring a validation response from the requesting device, and authenticating responsive validation messages using the secure processor. Responsive messages that correctly answer the validation message may confirm authenticity of the requesting device, and no further mitigating action is taken. The PaaK system may trigger vehicle configuration by cargo utilization control system 107 in advance of the user 140 entering the vehicle 105.

The processor(s) 150 may provide initial access to the vehicle 105 when the mobile device 120 is within the PEPS zone, and interact with cargo utilization control system 107 to complete vehicle configuration in advance of the user 140 entering the vehicle 105. Determining that the mobile device 120 is proximate to the vehicle 105 and within the PEPS zone, in conjunction with one or more other triggers, may cause pre-authorization steps to begin. For example, the processor(s) 150 may generate a secure processor initialization instruction responsive to a door latch opening, or a user touching the sensory area of a door handle or keyless entry keypad, or presence detection through cameras or other electromagnetic sensing. The processor(s) 150 may receive a sensor output that indicates an attempt to enter the vehicle.

The handle touch, by itself, would not trigger an unlock instruction. Rather, in an example embodiment, the touch to the door handle, plus the proximity indication associated with the position of the mobile device 120 with respect to the vehicle 105, may cause a door handle sensor (not shown in FIG. 1) to transmit sensor output to the processor(s) 150. The processor(s) 150 may receive the vehicle sensor output associated with the actuation of the door handle (and more precisely, associated with an actuation of a door latch mechanism (not shown in FIG. 1) of the door handle), and generate a secure processor initialization instruction to the secure processor(s) 150 in response.

The processor(s) 150 may also provide access to the vehicle 105 in conjunction with the secure processor(s) 150 by unlocking the door 198, based on the key-on request and/or the authentication message (key-on request and authentication message not shown in FIG. 1) stored in the cache memory of the automotive computer 145. The secure processor initialization instruction may initialize the secure processor(s) 150, by sending instructions that "wake up" the secure processor(s) 150 by changing a power mode profile from a low-energy state to a higher-energy state. Once initialized, the secure processor(s) 150 may verify the authentication message 181 stored in the cache memory of the automotive computer 145 before unlocking the door 198.

Without regard to the vehicle actions associated with the user's PaaK-enabled vehicle entry, the PaaK system may positively identify the user 140 by means of the PaaK authentication, and transmit the user authentication information to cargo utilization control system 107.

The computing system architecture of the automotive computer 145, VCU 165, and/or the cargo utilization control system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with the vehicle infotainment system 110 that may provide an interface for the navigation and GPS receiver 188, and the cargo utilization control system 107. The vehicle infotainment system 110 may include a human-machine interface (HMI) 111, and may include voice recognition features, biometric identification capabilities that can identify users based on facial recognition, voice recognition, fingerprint identification, or other biological identification means. In other aspects, the vehicle infotainment system 110 may provide user identification using mobile device pairing techniques (e.g., connecting with the mobile device 120, a Personal Identification Number (PIN)) code, a password, passphrase, or other identifying means.

FIG. 2 illustrates a functional schematic of an example architecture of a biometric authentication and occupant monitoring system (OMC) 187 that may be used for providing vehicle entry and signal authentication using biometric information and other human factors, and for providing user support and customization for the vehicle 105, in accordance with the present disclosure. In some aspects, the The biometric authentication and occupant monitoring system 200 may authenticate passive device signals from a Passive Entry Passive Start (PEPS)—configured device such as the mobile device 120, a passive key device such as the fob 179, and provide vehicle entry and signal authentication using biometric information and other human factors. The OMC 187 may also provide user support and customizations to enhance user experience with the vehicle 105 in multiple ways, including providing an identity of a vehicle user, providing anthropometry information for the vehicle user, and providing ingress and egress information associated with the vehicle user.

The OMC 187, which may be disposed in communication with the DAT controller 199, the TCU 160, the BLEM 195, and a plurality of other vehicle controllers 201, may include various combinations of vehicle sensors, input devices, and mechanisms. Examples of the plurality of other vehicle controllers 201 can include, one or more macro capacitor(s) 205 that may send vehicle wakeup data 206, the door handle(s) that may send PEPS wakeup data 207, NFC reader(s) 209 that send NFC wakeup data 210, the DAPs 191 that send DAP wakeup data 212, an ignition switch 213 that can send an ignition switch actuation signal 216, and/or a brake switch 215 that may send brake switch confirmation signals 218, among other possible components.

The DAT controller 199 may include and/or connect with a biometric recognition module 297 disposed in communication with the DAT controller 199 via a sensor Input/Output (I/O) module 203. The OMC 187 may connect with the DAT controller 199 to provide biometric authentication controls, including, for example, facial recognition, fingerprint recognition, voice recognition, gait recognition, etc., which may be usable for providing a unique identity of a vehicle user to the system 107. The DAT controller 199 may provide other information associated with characterization, identification, and/or verification for other human factors such as gait recognition, body heat signatures, eye tracking, etc., which may be used for user identification, anthropometric data, or both.

The DAT controller 199 may be configured and/or programmed to provide biometric authentication control for the vehicle 105, including, for example, facial recognition, fingerprint recognition, voice recognition, and/or other provide authenticating information associated with characterization, identification, occupant appearance, occupant status, and/or verification for other human factors such as gait recognition, body heat signatures, eye tracking, etc. The DAT controller 199 may obtain the sensor information from an external sensory system 281, which may include sensors disposed on a vehicle exterior and in devices connectable with the vehicle 105 such as the mobile device 120 and/or the fob 179. Occupant status information and other human factors such as body heat information, heartrate information, etc., may also be usable to determine and evaluate whether the user 140 is experiencing difficulty with vehicle ingress or regress. For example, an older user that routinely or occasionally experiences difficulty getting in or out of a vehicle may experience an increased heart rate, increased breathing, increased body temperature, or other biometric indicators.

The DAT controller 199 may further connect with an internal sensory system 283, which may include any number of sensors configured in the vehicle interior (e.g., the vehicle cabin, which is not depicted in FIG. 2). The external sensory system 281 and internal sensory system 283 can connect with and/or include one or more inertial measurement units (IMUs) 284, camera sensor(s) 285, fingerprint sensor(s) 287, and/or other sensor(s) 289, and obtain biometric data usable for characterization of the sensor information for identification of biometric markers stored in a secure biometric data vault (not shown in FIG. 2) onboard the vehicle 105. The DAT controller 199 can obtain, from the internal and external sensory systems 281 and 283, sensory data that can include external sensor response signal(s) 279 and internal sensor response signal(s) 275 (collectively referred to as sensory data, via the sensor I/O module 203. The DAT controller 199 (and more particularly, the biometric recognition module 297) may characterize the biometric sensory data, and generate occupant appearance and status information to the occupant manager 225, which may use the biometric sensory data according to described embodiments.

The internal and external sensory systems 283 and 281 may provide the sensory data 279 obtained from the external sensory system 281 and the sensory data 275 from the internal sensory system 283 responsive to an internal sensor request message 273 and an external sensor request message 277, respectively. The sensory data 279 and 275 may include information from any of the sensors 284-289, where the external sensor request message 277 and/or the internal sensor request message 273 can include the sensor modality with which the respective sensor system(s) are to obtain the sensory data.

The camera sensor(s) 285 may include thermal cameras, optical cameras, and/or a hybrid camera having optical, thermal, or other sensing capabilities. Thermal cameras may provide thermal information of objects within a frame of view of the camera(s), including, for example, a heat map figure of a subject in the camera frame. An optical camera may provide a color and/or black-and-white image data of the target(s) within the camera frame. The camera sensor(s) 285 may further include static imaging, or provide a series of sampled data (e.g., a camera feed) to the biometric recognition module 297. Example placement of vehicle camera sensor(s) 285, although not shown in FIG. 1 or FIG. 2, can include a vehicle dash camera, 2nd row camera(s), exterior B-pillar camera(s), cargo hold camera(s), etc.

The IMU(s) 284 may include a gyroscope, an accelerometer, a magnetometer, or other inertial measurement device. The fingerprint sensor(s) 287 can include any number of sensor devices configured and/or programmed to obtain fingerprint information. The fingerprint sensor(s) 287 and/or the IMU(s) 284 may also be integrated with and/or communicate with a passive key device, such as, for example, the mobile device 120 and/or the fob 179. The fingerprint sensor(s) 287 and/or the IMU(s) 284 may also (or alternatively) be disposed on a vehicle exterior space such as the engine compartment (not shown in FIG. 2), door panel (not shown in FIG. 2), etc. In other aspects, when included with the internal sensory system 283, the IMU(s) 284 may be integrated in one or more modules disposed within the vehicle cabin or on another vehicle interior surface.

The biometric recognition module 297 may be disposed in communication with one or more facial recognition exterior feedback displays (not shown in FIG. 2), which can operate as a user interface accessible to the user 140 outside of the vehicle 105 to provide facial recognition feedback information associated with facial recognition processes described herein. The biometric recognition module 297 may further connect with one or more fingerprint exterior feedback displays (not shown in FIG. 2) that may perform similar communication functions associated with fingerprint recognition processes described herein, including providing fingerprint authentication feedback information to the fingerprint exterior feedback displays accessible to the user 140 outside of the vehicle 105 (also referred to in conjunction with the fingerprint exterior feedback display as "feedback displays"). It should be appreciated that the feedback displays may be and/or include a stationary I/O or other display disposed on the vehicle, the mobile device 120, the fob 192, and/or some other wired or wireless device.

The OMC 187 can include an authentication manager 217, a personal profile manager 219, a command and control module 221, an authorization manager 523, an occupant manager 225, and a power manager 227, among other control components.

The authentication manager 217 may communicate biometric key information 254 to the DAT 299. The biometric key information can include biometric mode updates indicative of a particular modality with which the internal and/or external sensory systems 283 and 281 are to obtain sensory data. The biometric key information 254 may further include an acknowledgement of communication received from the biometric recognition module 297, an authentication status update including, for example, biometric indices associated with user biometric data, secured channel information, biometric location information, and/or other information. In some aspects, the authentication manager 217 may receive biometric key administration requests 256 and other responsive messages from the biometric recognition module 297, which can include, for example, biometric mode message responses and/or other acknowledgements.

The authentication manager 217 may further connect with the TCU 160 and communicate biometric status payload information 241 to the TCU 160 indicative of the biometric authentication status of the user 140, requests for key information, profile data, and other information. The TCU 160 may send and/or forward digital key payload 291 to the server(s) 170 via the network(s) 125, and receive digital key status payload 293 from the server(s) 170 and provide responsive messages and/or commands to the authentication manager 217 that can include biometric information payload 243.

Moreover, the authentication manager 217 may be disposed in communication with the BLEM 195, and/or other the other vehicle controllers and systems 201 according to embodiments described in the present disclosure. For example, the BLEM 193 may send a PaaK wakeup message 214, or another initiating signal indicating that one or more components should transition from a low-power mode to a ready mode. This feature may provide a wake-up status for the vehicle 105 to accommodate vehicle recommendations made by the system 107 such that a vehicle configuration change is made prior to the user 140 reaching the vehicle to board the vehicle or load cargo into a cargo hold (e.g., a trunk, front storage compartment, etc.).

The authentication manager 217 may also connect with the personal profile manager 219, and the power manager 227. The personal profile manager 219 may perform data management associated with user profiles, which may be stored in the automotive computer 145 and/or stored on the server(s) 170. For example, the authentication manager 217 may send occupant seat position information 229 to the personal profile manager 219, which may include a seat position index (not shown in FIG. 2) indicative of preferred and/or assigned seating for passengers of the vehicle 105. The personal profile manager 219 may update seating indices, delete and create profiles, and perform other administrative duties associated with individualized user profile management.

According to another embodiment, the personal profile manager 219 may provide in-vehicle user profile management that works in conjunction or instead of a fleet-level database stored in connected server(s) 170. In other aspects, the server(s) 170 may store user profile information and include vehicle user profile information with the digital key payload 293 such that the OMC 187 may update the occupant manager 225 database locally at the vehicle 105.

The power manager 227 may receive power control commands from the authentication manager 217, where the power control commands are associated with biometric authentication device management including, for example, device wakeup causing the biometric recognition module 297 and/or the DAT controller 199 to transition from a low power (standby mode) state to a higher power (e.g., active mode) state. The power manager 227 may send power control acknowledgements 251 to the authentication manager 217 responsive to the control commands 245. For example, responsive to the power and control commands 245 received from the authentication manager 217, the power manager 227 may generate a power control signal 265 and send the power control signal to the biometric recognition module. The power control signal 265 may cause the biometric recognition module to change power states (e.g., wakeup, etc.). The biometric recognition module 297 may send a power control signal response 267 to the power manager 227 indicative of completion of the power control signal 265.

The authentication manager 217 and/or the personal profile manager 219 may further connect with the command and control module 221, which may be configured and/or programmed to manage user permission levels, and control vehicle access interface(s) (not shown in FIG. 2) for interfacing with vehicle users. The command and control module 221 may be and/or include, for example, the BCM 193 described with respect to FIG. 1. For example, the authentication manager 217 may send command and control authentication information 231 that cause the command and control module 221 to actuate one or more devices according to successful or unsuccessful authentication of a device, a signal, a user, etc. The command and control module 221 may send acknowledgements 233 and other information including, for example, vehicle lock status.

The occupant manager 225 may connect with the authentication manager 217, and communicate occupant change information 257 indicative of occupant changes in the vehicle 105 to the authentication manager 217. For example, when occupants enter and exit the vehicle 105, the occupant manager 225 may update an occupant index (not shown in FIG. 2), and transmit the occupant index as part of the occupant change information 257 to the authentication manager. The occupant manager 225 may further connect with the occupant manager 536 to update the occupant manager 225 with seat indices 259, which may include confirmation messages for seat index changes, and occupant entries and exits from the vehicle 105. The occupant entries and exits may include the anthropometric information used for generating vehicle recommendations.

The occupant manager 225 may also receive seat indices 259 from the authentication manager 217, which may index seating arrangements, positions, preferences, and other information. The seat indices may include preferred seat configurations associated with particular users during vehicle entry, vehicle exit, and when loading cargo in the vehicle. For example, user A may prefer, on Tuesday evenings, to lay a rear passenger seat flat to accommodate sporting equipment needed for a weekly sports engagement such as golf or hockey. The seat indices may uniquely identify a user with such preferences, connect the user preferences to particular dates and times of preferred vehicle configurations, and store the records in the OMC memory (not shown in FIG. 2).

The occupant manager 2125 may also connect with the command and control module 221. The command and control module 221 may receive adaptive vehicle control information 239 from the occupant manager 225, which may communicate and/or include settings for vehicle media settings, seat control information, occupant device identifiers, and other information.

The occupant manager 225 may be disposed in communication with the DAT controller 199, and may communicate biometric mode update information 261 to the biometric recognition module 297, which may include instructions and commands for utilizing particular modalities of biometric data collection from the internal sensory system 283 and/or the external sensory system 281. The occupant manager 225 may further receive occupant status update information and/or occupant appearance update information (collectively shown as occupant information 263 in FIG. 2) from the biometric recognition module 297.

Figure 3:
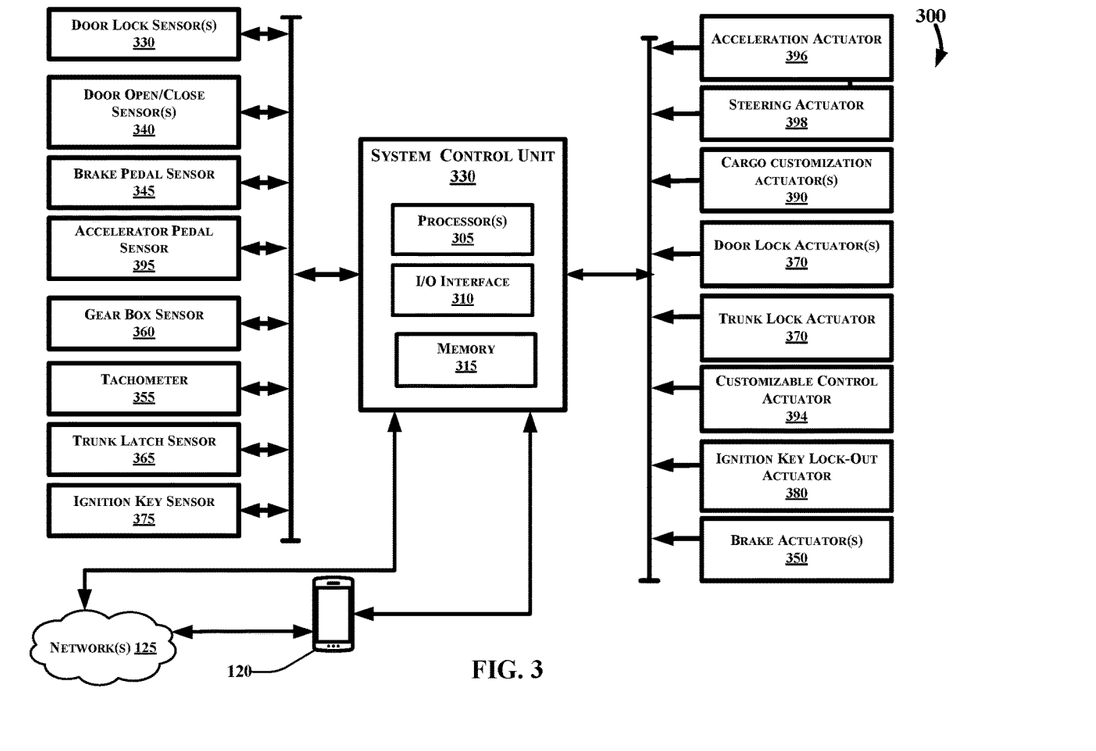
FIG. 3 illustrates an example automotive control system that may be installed in an engine compartment of a vehicle in accordance with the present disclosure.

FIG. 3 illustrates a functional schematic of a vehicle control system architecture 300 (hereafter "the control system 300"). The control system 300 is shown having a system control unit 130. The system control unit 330 may include, in one example, one or more processor(s) 305, an Input/Output (I/O) interface 310, and a computer-readable memory 315. The memory 315 may include a media controller 320, and a global positioning system (GPS) 397, among other software. For example, the system control unit 330 may generally include an operating system, although one is not shown in FIG. 2. For the sake of simplicity, the computing system architecture 300 may also omit certain computing architectures and controlling modules, such as the CAN 180, the ECM 185, the TCM 190, and the BCM 193. It should be readily understood that the computing environment 100 and the computing architecture depicted in FIGS. 1-3 are examples of possible implementations according to the present disclosure, and thus, are not to be considered limiting or exclusive.

The system control unit 330 may utilize the memory 315 to store programs in code and/or to store data for performing various vehicle bailout operations in accordance with the disclosure. The memory 315 is a non-transitory computer-readable memory. The processor(s) 305 may be configured and/or programmed to execute computer-executable instructions stored in the memory 315 for performing various functions of the system control unit 330 as well as for performing vehicle control capabilities in accordance with the disclosure. Consequently, the memory 315 may be used for storing code and/or data code and/or data for performing operations in accordance with the disclosure.

The one or more processor(s) 305 may be disposed in communication with one or more memory devices (e.g., the memory 315 and/or one or more external databases, such as the fleet-level database(s) 400*di*.

The memory 315 may be one example of a non-transitory computer-readable medium, and may be used to store programs in code and/or to store data for performing various operations in accordance with the disclosure. The instructions in the memory 315 can include one or more separate programs, each of which can include an ordered listing of computer-executable instructions for implementing logical functions. In another example implementation, some or all components of the control system 300 may be shared with the automotive computer 145.

The memory 315 may store various code modules such as, for example, a secure communication controller (not shown in FIG. 3) for establishing encrypted channel(s) between the mobile device 120 and the vehicle telematics system. The memory 315 may also receive the one or more instruction set(s) for programming the vehicle system control unit 330 onboard the vehicle 105.

The I/O interface 310 may be configured and/or programmed to receive signals from various sources such as sensors and transducers provided in the vehicle 105. For example, the I/O interface 310 may receive status information from one or more door sensor(s) 340 disposed in one or more doors 198 (as shown in FIG. 1). The status information may include an indication whether the door is locked or unlocked. The processor(s) 305 may reference the status information to determine whether a lock instruction or unlock instruction is to be issued for activating one or more door lock actuators 335. For example, the processor(s) 305 may activate the door lock actuators 335 in order to lock one or more doors and secure the contents of the vehicle 105 based at least in part on the instruction set(s) 165, which may include a lock command issued via the mobile device 120. In other aspects, the instruction set(s) 165 may instruct the door lock actuators 335 to unlock a door at a predetermined time, lock a door after a certain predetermined time, lock or unlock a door after particular user-selected events, and/or actuate according to other rules. In other example embodiments, the instruction set(s) may instruct the door lock actuators 335 to unlock or lock based on a custom command, such as an actuation command sent from the mobile device 120.

One or more door open/close sensor(s) 340 may be disposed in one or more doors (not shown in FIG. !~) of the vehicle 105. Accordingly, the I/O interface 310 may receive a signal indicative of whether one or more doors of the vehicle 105 have been opened or closed. The processor(s) 305 may use the status information to generate one or more control signal(s) for activating one or more door lock actuators 335. The processor(s) 305 may activate the door lock actuators 335 based on a command from the application 135 operative on the mobile device 120. For example, a user may wish to secure the contents of the vehicle 105 when the user has left the vehicle 105 for some third party (e.g., towing personnel), or for any other reason. In one embodiment, the door open/close sensor(s) 340 may indicate whether an unlock command has successfully executed, such that the doors were opened by the third party as intended.

The I/O interface 310 may receive from the tachometer 355 data about the speed of the vehicle 105. For, example, the processor(s) 305 may retrieve one or more signals from the tachometer to analyze vehicle speed characteristics, to determine whether the vehicle 105 is operating within limits set forth in the instruction set(s). For example, the I/O interface 310 may receive an indication from the brake pedal sensor 345 whether the brake pedal (not shown in FIG. 2) has been depressed and/or may indicate an extent of depression. The I/O interface 310 may also receive from an accelerator pedal sensor 395 an indication whether the accelerator has been depressed and/or signals an indication of the extent of depression of the accelerator.

For example, the instruction set may indicate that the vehicle is speed limited to a predetermined speed (e.g., 5 miles per hour). Accordingly, the processor(s) 305 may receive a signal from a tachometer 355 indicative of vehicle speed and determine if the signal from the tachometer 255 is within a predetermined range of allowed speed (based on the instruction set(s)). The processor(s) 305 may transmit a command to the brake actuator(s) 350 responsive to determining that the vehicle 105 is operating outside of the prescribed limit in the instruction set. Stated another way, the processor(s) may evaluate a signal response from the tachometer 355 indicative of speed, compare the speed to a predetermined range of values associated with allowable operation, and issue one or more control commands to the brake actuator(s) 350 responsive to the comparison.

The I/O interface 310 may also receive gear engagement data indicative of a gear engagement from the gear box sensor 360.

The system control unit 330 may also be configured with the global positioning system (GPS) 397.

The processor(s) 305 may issue one or more commands for controlling the drive function, including, for example, setting a maximum drive speed to a particular gear configuration (e.g., "Low Gear"), disabling the ignition using the ignition key lock-out actuator 280, etc.

The I/O interface 310 may receive, from the trunk latch sensor, an indication whether the trunk of the vehicle 105 is locked or unlocked. The indication may be used by the processor(s) 305 to issue one or more instructions for activating a trunk lock actuator 270 such that a trunk hatch of the vehicle 105 may be opened or closed by a party given access. In other aspects, the user 140 may instruct through the application 135 that the towing personnel be given access to the trunk if needed, to access a spare tire, or perform some other duty. Accordingly, the processor(s) 305 may instruct the trunk lock actuator 270 to unlock the trunk.

In other aspects, the processor(s) 305 may cause vehicle configuration changes based on vehicle settings change commands issued by the system 107. For example, the processor(s) 305 may cause the trunk latch sensor 365 to open, close, unlock, etc. In other aspects, the processor(s) 305 may cause a door open/close sensor 340 to function, a trunk lock actuator 370 to function, door lock actuator 370 to function, or any number of customizable control actuators 394 to function based on the vehicle settings change command. In other aspects, the processor(s) 305 may cause one or more cargo customization actuator(s) 390 to change a cargo hold feature such as lowering or stowing vehicle cargo area components, etc.

The I/O interface 310 may receive, from the ignition key sensor 375, an indication whether a car key has been left in a starter mechanism of the vehicle 105. The processor(s) 305 may carry out various operations based at least in part on the car key position information, such as, for example, enabling or disabling the ignition key lock-out actuator 280, which may secure the vehicle 105 after the driver has left the vehicle.

In other aspects, the ignition key sensor 375 may indicate whether authorized or unauthorized personnel have started the vehicle 105. In one example, the processor(s) 305 may instruct an ignition key lock-out actuator 280 to disengage an engine of the vehicle 105 responsive to determining that an unauthorized start has occurred. Disengaging the ignition key lock-out actuator 380 may disable the vehicle 105. In other aspects, the ignition key lock-out actuator 380 may disengage the engine responsive to other factors such as, for example, time, geographic location, distance, speed, etc. The acceleration actuator 396 and/or steering actuator 398 may provide vehicle control to autonomous driving controllers when they are included in the vehicle 105.

The system control unit 330 may also be communicatively coupled to and/or include the vehicle media controller 320. Some examples, the vehicle media controller 320 can include an infotainment system mounted on a dashboard of the vehicle 105, a radio communications device mounted in the vehicle 105, a personal device such as a smartphone carried by the driver or another occupant of the vehicle 105, a computer installed in the vehicle 105, and/or a portable computing device such as a tablet computer or the mobile device 120. The vehicle media controller 320 may be used to inform an occupant of the vehicle.

Figure 4:
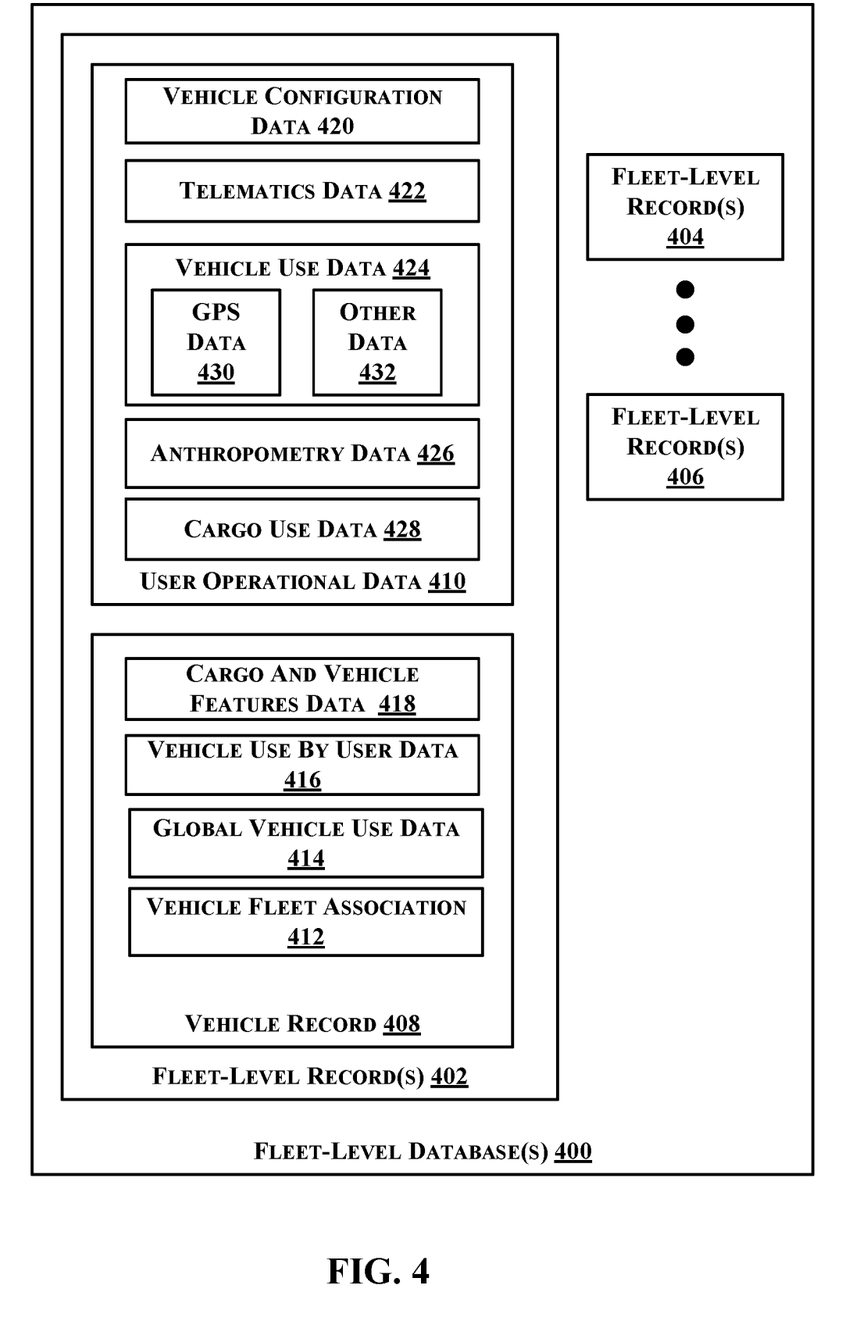
FIG. 4 depicts a fleet-level database in accordance with the present disclosure.

FIG. 4 is a block diagram for a fleet-level database(es) 400 comprising one or more fleet-level records 402, 404, and 406. Although shown as three vehicle level records as an example, it should be appreciated that databases often include hundreds or thousands of records. The fleet-level database(s) 400 may be stored in a memory local (onboard) the vehicle 105, or remote from the vehicle 104 in a distributed computing environment such as that described with respect to FIG. 1. For example, the database(s) 400 may be stored and/or managed on the server(s) 170 (shown in FIG. 1).

The example fleet-level record(s) 402 include data structures associated with connected vehicles (e.g., the vehicle 105 is one such connected vehicle). Vehicle record 408 provides an example data structure that may include cargo and vehicle features data 418, vehicle use by user data 416, global vehicle use data 414, and vehicle fleet association 412.

The vehicle cargo and vehicle features data 418 may include cargo volume or capacity, weight capacity, vehicle cargo area finish information (e.g., carpet vs. spray bed liner, etc.), seat articulation for providing cargo area expanded space, etc. In some aspects, a vehicle may include more than one configurable cargo setup. Accordingly, each possible combination of cargo configuration for any given connected vehicle may be stored in the cargo and vehicle features data 418.

The vehicle use by user data 416 can include persistent vehicle-level data that identifies a particular user that has used the vehicle. For example, if a vehicle record 408 is directed to a vehicle in a shared use environment, each of the known vehicle user identity may be stored in the vehicle use by user data 416, and include date information, time information, user profile identification and linking data, and other information.

The global vehicle use data may include all user identity information associated with all users within a particular vehicle fleet. One example of global vehicle use data may include vehicle usage information associated with an entire family, whereas the vehicle use by user data 416 may include the vehicle use information associated with a single user.

The vehicle fleet association 412 may connect the vehicle record 408 to one or more other vehicle records (not shown in FIG. 4) that may be associated with a particular vehicle fleet.

The vehicle use data 424 may include usage data for a particular vehicle such as, for example, GPS data 430, or other data 432 such as maintenance information, vehicle equipment functionality or non-functionality, etc.

The vehicle use data 424 may further include anthropometry data 426 associated with the user record, and cargo use data 428 that can provide date, time, cargo usage characteristics, and other information.

The anthropometry data 426 may provide a data structure for correlating user mobility or age-related limitations or abilities with cargo use data and other preferences for vehicle usage. For example, an aged user that has difficulty exiting low profile vehicles may have such records quantitatively stored in the user operation data section 410.

The vehicle records 408 may further include vehicle configuration data 420, which may indicate particular configurations that a vehicle is capable, information indicative of automatically-actuatable configurations (e.g., power reclining seats, etc.). The telematics data 422 may provide another layer of vehicle and user history that may provide a level of prediction capability for the system 107. For example, those skilled in the art of data analytics recognize that historic vehicle configuration data 420, in combination with date, time, age, mobility information, etc., are usable by machine learning algorithms in wide use today to receive categorized, correlated, and weighted data inputs, and determine probable outcomes based on observed patterns of use. Accordingly, a trained machine learning algorithm (either supervised or in some cases, unsupervised) may determine and predict a current vehicle use based on observed patterns of prior use.

Figure 5:
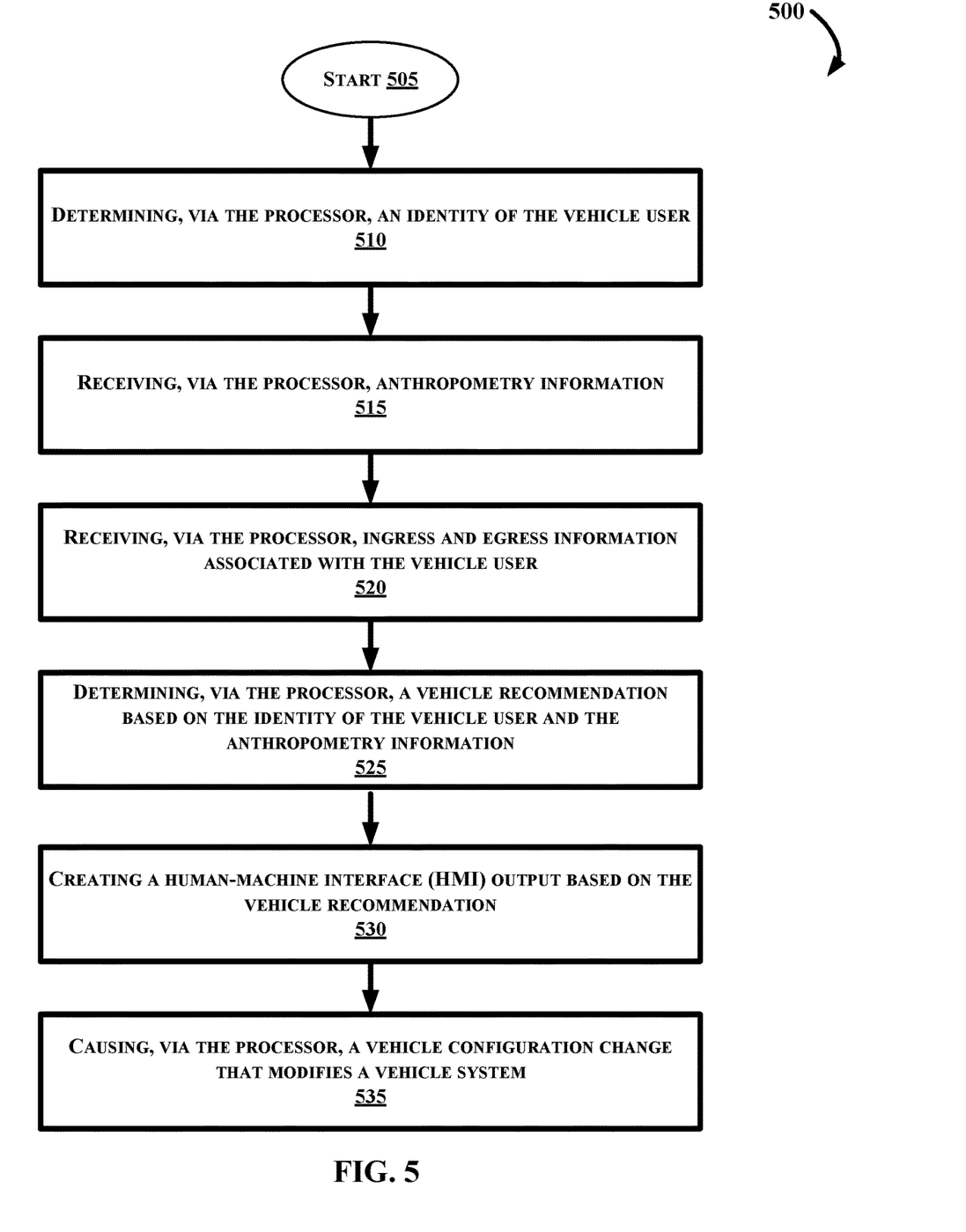
FIG. 5 depicts a flow diagram of an example method for controlling a vehicle in accordance with the present disclosure.

FIG. 5 is a flow diagram of an example method 500 for controlling a vehicle, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, responsive to an initial start step 505, where a user interacts with a vehicle as described with respect to FIGS. 1-4, at step 510, the method 500 may further include determining, via the processor, an identity of the vehicle user. This step may include receiving the user identity information from one or more server(s), where the identity indicates a unique vehicle user. In other aspects, the identity information may be received from a mobile device, a smart wearable device, or other device configured and/or programmed to indicate identity of the user. The vehicle may provide an affirmative user identity via the biometric authentication and occupant monitoring controller. In other aspects, the server(s) may provide the vehicle user identity, or a combination of the server(s) and the biometric authentication and occupant monitoring controller may provide the vehicle user identity information.

At step 515, the method 500 may further include receiving, via the processor, anthropometry information. The anthropometry information can include one or more of user age, user height, and user mobility. This step may include receiving, via the processor, information indicative of measurements, proportions, and other factors associated with the user's ease or difficulty entering and exiting the vehicle. In some aspects, this step may include receiving, from the mobile device, one or more vehicle sensory devices, or both the mobile device and the vehicle sensory devices, information having time information, date information, user identity information, vehicle identification information, vehicle fleet information, and other data that are usable to indicate the user's experience of entering the vehicle and exiting the vehicle. This step may further include receiving, from any connected device or system, biometric information indicative of heart rate, respiration, and other biometric indicators of physical stress of the user while interacting with the vehicle.

In some aspects, this step may include receiving the anthropometry information at the one or more server(s), and the vehicle receives the anthropometry information and/or a vehicle recommendation dataset from the server(s).

In another aspect, this step may include receiving the anthropometry information from the connected devices and sensors directly, in addition to or instead of receiving the data from the server(s).

At step 520, the method 500 may further include receiving, via the processor, ingress and egress information associated with the vehicle user. This step may include collecting and/or receiving ingress and egress information associated with the vehicle user, and/or generating a historic dataset associated with the vehicle having vehicle entry and exit information.

At step 525, the method 500 may further include determining, via the processor, a vehicle recommendation based on the identity of the vehicle user and the anthropometry information. The vehicle recommendation may be further based on a vehicle use history. This step may include receiving, via the processor, cargo use information indicative of user utilization of a vehicle cargo hold. In some aspects, the vehicle recommendation is based on a vehicle cargo hold capacity record associated with the vehicle. Accordingly, this step may further include determining, via the processor, vehicle cargo use information indicative of one or more of a cargo volume, date of vehicle cargo hold use, and date of vehicle cargo hold use. In some aspects, vehicle recommendation may include a vehicle selection of a set vehicles comprising a vehicle fleet. For example, the vehicle recommendation may indicate a particular vehicle of the vehicle fleet for use given the user's utilization of a cargo hold, date information, time information, and/or mobility issues associated with the user's anthropometry information.

In other aspects, the vehicle recommendation may include recommendations for purchase of a particular vehicle to add to the vehicle fleet such that ease of entry or exit of a vehicle is enhanced. The vehicle recommendation may further include recommendations for use of a particular model, style, or vehicle feature associated with available vehicles in a ridehailing or transportation as a service network.

At step 530, the method 500 may further include creating a human-machine interface (HMI) output based on the vehicle recommendation.

In other aspects, this step can further include determining, via the processor and based on the vehicle cargo use information, a predictive imminent use of the vehicle cargo hold, and generating the vehicle recommendation based on the predictive imminent use of the vehicle cargo hold.

At step 535, the method 500 may further include causing, via the processor, a vehicle configuration change that modifies a vehicle system. This step may include generating, via the processor and based on the vehicle recommendation, a vehicle settings change command. This step may further include causing, via the processor, the vehicle configuration change based on the vehicle settings change command. In some aspects, this step may include generating, via the processor and based on the vehicle recommendation, a settings change command, and causing, via the processor, a vehicle configuration change based on the settings change command.

In one aspect, the vehicle configuration includes seat position configuration, where the settings change command cause a vehicle seat actuator to position the seat forward, position the seat backward, fold down a seat back rest that provides ease of vehicle entry or exit, fold up a seat back rest that provides ease of vehicle entry or exit, change a seat height that provides ease of vehicle entry or exit, or perform another vehicle action that alters or enables one or more auxiliary vehicle tools for usage.

In another aspect, the vehicle configuration includes a cargo hold configuration step, where the controller processor causes a trunk lock actuator to open, a door lock actuator to lock, unlock, open a door, close a door, fold down a cargo hold seat, fold up a cargo hold seat, or actuate a customizable control actuator that causes a user-customizable vehicle action.

This step may include determining an identity of the user as the user approaches the vehicle or provides some other indication of an intent to use the vehicle, and the system performs the vehicle configuration in anticipation of an imminent vehicle use. The vehicle configuration may be complete as the user reaches the vehicle such that the user's interaction with the vehicle has enhanced utility, ease, and positive user experience.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle, comprising:
   determining, via a processor, an identity of a vehicle user;
   receiving, via the processor, anthropometry information comprising each of a user height, a user mobility, and biometric information of the vehicle user received from a device, wherein the biometric information comprises information of the vehicle user corresponding to heat information and breath rate information;
   receiving, via the processor, ingress and egress information associated with the vehicle user;
   determining, via the processor, a vehicle recommendation based on the identity of the vehicle user, a vehicle cargo hold capacity record associated with the vehicle, and the anthropometry information;
   creating a human-machine interface (HMI) output based on the vehicle recommendation; and
   causing, via the processor, a vehicle configuration change that modifies a vehicle system, the vehicle configuration change configured to be performed with the vehicle in a parked state, the vehicle configuration change comprising, based on the vehicle recommendation, at least one of actuating a trunk latch sensor to assist the vehicle user with loading and unloading, and actuating a cargo customization actuator to change a cargo hold feature of the vehicle.

2. The method according to claim 1, wherein the vehicle recommendation comprises a vehicle selection of a set vehicles comprising a vehicle fleet.

3. The method according to claim 1, wherein the vehicle recommendation is further based on a vehicle use history.

4. The method according to claim 1, further comprising:
   generating, via the processor and based on the vehicle recommendation, a vehicle settings change command; and
   causing, via the processor, the vehicle configuration change based on the vehicle settings change command.

5. The method according to claim 1, wherein the ingress and egress information associated with the vehicle user is at least partially based on the heat information and the breath rate information of the vehicle user, and wherein the ingress and egress information comprises a historic dataset associated with the vehicle comprising vehicle entry and exit information.

6. The method according to claim 1, further comprising receiving, via the processor, cargo use information indicative of user utilization of a vehicle cargo hold.

7. The method according to claim 1, further comprising obtaining video and image data of the vehicle user and a plurality of other users with a camera of the vehicle, and in response, determining a relative ease of use of the vehicle historically experienced the vehicle user and the plurality of other users as the vehicle user and the plurality of other users interact with the vehicle over time.

8. The method according to claim 7, further comprising, based on the determination of the relative ease of use of the vehicle user, recommending to the vehicle user that the vehicle user operate a second, different vehicle on a future trip.

9. The method according to claim 1, wherein the device is a wearable device of the vehicle user, the method further comprising:
   determining, via the processor, vehicle cargo use information indicative of each of a cargo volume, date of vehicle cargo hold use, and date of vehicle cargo hold use.

10. The method according to claim 9, further comprising:
    determining, via the processor and based on the vehicle cargo use information, a predictive imminent use of the vehicle cargo hold; and
    generating the vehicle recommendation based on the predictive imminent use of the vehicle cargo hold.

11. The method according to claim 10, further comprising:
    generating, via the processor and based on the vehicle recommendation, a settings change command; and
    causing, via the processor, the vehicle configuration change based on the settings change command.

12. A vehicle cargo utilization control system, comprising:
a processor disposed in a vehicle controller; and
a memory for storing executable instructions, the processor programmed to execute the instructions to:
determine identity of a vehicle user;
receive anthropometry information comprising each of a user height, a user mobility, and biometric information of the vehicle user received from a device, wherein the biometric information comprises information of the vehicle user corresponding to heat information and breath rate information;
receiving, via the processor, ingress and egress information associated with the vehicle user;
determine a vehicle recommendation based on the identity of the vehicle user, a vehicle cargo hold capacity record associated with a vehicle, and the anthropometry information; and
create a human-machine interface (HMI) output based on the vehicle recommendation; and
cause, via the processor, a vehicle configuration change that modifies a vehicle system, the vehicle configuration change configured to be performed with the vehicle in a parked state, the vehicle configuration change comprising, based on the vehicle recommendation, at least one of actuating a trunk latch sensor to assist the vehicle user with loading and unloading, and actuating a cargo customization actuator to change a cargo hold feature of the vehicle.

13. The system according to claim 12, wherein the vehicle recommendation comprises a vehicle selection of a set vehicles comprising a vehicle fleet.

14. The system according to claim 12, wherein the vehicle recommendation is further based on a vehicle use history.

15. The system according to claim 12, wherein the processor is further programmed to execute the instructions to:
generate, based on the vehicle recommendation, a vehicle settings change command; and
cause the vehicle configuration change based on the vehicle settings change command.

16. The system according to claim 12, wherein the ingress and egress information associated with the vehicle user comprises a historic dataset comprising vehicle entry and exit information.

17. The system according to claim 12, wherein the processor is further programmed to execute the instructions to:
receive, via the processor, vehicle cargo use information indicative of user utilization of a vehicle cargo hold.

18. The system according to claim 17,
wherein the vehicle cargo use information identifies each of a cargo volume, time information, and date information, wherein the vehicle cargo use information is indicative of each of the cargo volume, date of vehicle cargo hold use, and date of vehicle cargo hold use; and
wherein the processor is further programmed to execute the instructions to:
determine, based on the vehicle cargo use information, a predictive imminent use of the vehicle cargo hold;
generate the vehicle recommendation based on the predictive imminent use of the vehicle cargo hold;
determine cargo use information indicative of one or more of the cargo volume, date of vehicle cargo hold use, and date of vehicle cargo hold use;
generate, based on the vehicle recommendation, a settings change command; and
cause the vehicle configuration change based on the settings change command.

19. A distributed computing system for vehicle cargo utilization control, comprising:
a processor disposed in communication wireless communication with a vehicle controller; and
a memory for storing executable instructions, the processor programmed to execute the instructions to:
receive vehicle information and update a vehicle record on a fleet-level vehicle database;
receive, via the processor, a vehicle user identity record, and link the vehicle record to the vehicle user identity record;
receive ingress and egress information associated with the vehicle user identity record, and update a user operational dataset;
generate anthropometry information associated with a vehicle user based on the vehicle user identity record, the anthropometry information comprising each of a user height, a user mobility, and biometric information of the vehicle user received from a device, wherein the biometric information comprises information of the vehicle user corresponding to heat information and breath rate information; and
generate, based on the vehicle record, a vehicle cargo hold capacity record associated with the vehicle, and the anthropometry information, a vehicle recommendation instruction set executable by the vehicle controller, wherein the vehicle recommendation instruction set is executable by the vehicle controller to cause a vehicle configuration change that modifies a vehicle system, the vehicle configuration change configured to be performed with the vehicle in a parked state, the vehicle configuration change comprising, based on the vehicle recommendation, at least one of actuating a trunk latch sensor to assist the vehicle user with loading and unloading, and actuating a cargo customization actuator to change a cargo hold feature of the vehicle.

* * * * *